US012596091B2

(12) United States Patent
Münch et al.

(10) Patent No.: US 12,596,091 B2
(45) Date of Patent: Apr. 7, 2026

(54) ELECTROCHEMICAL GAS SENSOR

(71) Applicant: Testo SE & Co. KGaA,
Titisee-Neustadt (DE)

(72) Inventors: Reinhold Münch, Freiburg (DE);
Gregor Steiner, Titisee-Neustadt (DE);
Marc Bittner, Hinterzarten (DE);
Alexander Kirmair, Titisee-Neustadt
(DE)

(73) Assignee: Testo SE & Co. KGaA,
Titisee-Neustadt (DE)

( * ) Notice: Subject to any disclaimer, the term of this
patent is extended or adjusted under 35
U.S.C. 154(b) by 701 days.

(21) Appl. No.: 17/846,092

(22) Filed: Jun. 22, 2022

(65) Prior Publication Data

US 2022/0412916 A1 Dec. 29, 2022

(30) Foreign Application Priority Data

Jun. 23, 2021 (DE) ......................... 102021116238.6

(51) Int. Cl.
*G01N 27/40* (2006.01)
*G01N 27/407* (2006.01)

(52) U.S. Cl.
CPC ......... *G01N 27/4071* (2013.01); *G01N 27/40*
(2013.01); *G01N 27/4075* (2013.01)

(58) Field of Classification Search
CPC .............. G01N 27/4071; G01N 27/40; G01N
27/4075; G01N 27/4045; G01N 27/26;
G01N 27/30
See application file for complete search history.

(56) References Cited

U.S. PATENT DOCUMENTS 4,587,003 A * 5/1986 Tantram ............... G01N 27/404
204/415

FOREIGN PATENT DOCUMENTS

| DE | 3783103 | 5/1993 | |
|---|---|---|---|
| EP | 0126623 | 5/1984 | |
| EP | 2871472 | 5/2015 | |
| EP | 3674701 | 7/2020 | |
| EP | 3719487 | 10/2020 | |
| GB | 2436144 A * | 9/2007 | .............. G01N 1/22 |
| WO | WO-0131326 A1 * | 5/2001 | ........... G01N 27/404 |
| WO | 2005015195 | 2/2005 | |

* cited by examiner

*Primary Examiner* — Alexander W Keeling
*Assistant Examiner* — Kaylee Tseng
(74) *Attorney, Agent, or Firm* — Volpe Koenig

(57) ABSTRACT
An electrochemical gas sensor (1) having a stacked assembly of at least one first electrode (3) and a second electrode (6), which are respectively arranged on a carrier membrane (2, 5), and a separator (4) arranged between the electrodes (3, 6), including a gas conduction path (14) between the first electrode (3) and the second electrode (6). The gas conduction path (14) is constituted within the structural space defined by the electrodes (3, 6).

9 Claims, 4 Drawing Sheets

ELECTROCHEMICAL GAS SENSOR

INCORPORATION BY REFERENCE

The following documents are incorporated herein by reference as if fully set forth: German Patent Application No. 10 2021 116 238.6, filed Jun. 23, 2021.

TECHNICAL FIELD

The invention relates to an electrochemical gas sensor having a stacked assembly of at least one first electrode and a second electrode, which are respectively arranged on a carrier membrane, and a separator arranged between the electrodes, wherein a gas conduction path is constituted between the first electrode and the second electrode.

BACKGROUND

Gas sensors of this type are known and are employed, for example, for the measurement of CO and $H_2$.

Previously, it has been customary for gas fractions to be conducted through carrier membranes, upon which catalysts are arranged for the generation of an electrochemical reaction.

These carrier membranes of the first and second electrodes, i.e. a measuring electrode and an auxiliary electrode, are mutually overlapping about the perimeter on the outer side, and constitute a gas conduction path about the outer perimeter of the electrodes.

SUMMARY

The object of the invention is the provision of a more compact assembly.

This object is fulfilled by an electrochemical sensor having one of more of the features described herein.

Accordingly, the electrochemical sensor according to the invention is characterized in that the gas conduction path is constituted within the structural space defined by the electrodes.

According to the prior art, the gas conduction path is customarily routed about the perimeter of the electrodes. As a result, particularly in the case of small sensors, a substantial structural space is required, thus impairing any further miniaturization.

The arrangement of the gas conduction path, according to the invention, within the structural space of the electrodes provides an internal gas conduction path, such that no additional structural space is required about the perimeter. As a result, it is essentially possible for smaller sensors to be produced than in the case of a conventional gas conduction path.

This gas conduction path is constituted, according to one embodiment, wherein at least one feedthrough opening is arranged in the separator. In this way, an internal gas conduction path can be constituted in a simple manner.

In one embodiment, at least one feedthrough opening is additionally arranged in the carrier membrane of the first electrode. In this manner, the gas conduction path can be more precisely defined.

The feedthrough opening in the separator and/or in the carrier membrane can thus be produced in a simple manner, for example by stamping. By means of different feedthrough openings, the diffusion rate can be adjusted to different applications, or for different sensors.

In principle, a plurality of feedthrough openings can also be provided, which define a common gas conduction path.

In one embodiment, an insert is inserted, for example in the above-mentioned feedthrough opening in the separator and/or in the carrier membrane of the first electrode. In this manner, the gas contact and/or the gas path between the first electrode and the second electrode can be securely established. To this end, the insert preferably assumes the same shape as the feedthrough opening, and fully occupies the surface area thereof.

In one embodiment, the separator and/or the carrier membrane comprises at least two feedthrough openings, wherein a separate gas conduction path is defined by each feedthrough opening within the structural space defined by the electrodes. In this manner, for example, two or more separate sensors can be arranged within a housing, wherein each sensor possesses a dedicated gas conduction path.

For the arrangement of the one or more feedthrough openings, there are no further limitations, other than that they are located within an electrode. An effective conversion of gas is thus ensured, and a compact layout made possible.

In one embodiment, the at least one feedthrough opening is arranged centrally and/or coaxially, or essentially centrally and/or coaxially to the electrodes. In particular, an individual feedthrough opening can be arranged at the geometrical midpoint of an electrode. A plurality of feedthrough openings are preferably arranged symmetrically to the geometrical midpoint. To this end, the carrier membranes and the electrodes can preferably be circular or annular, or configured in the form of a regular polygon.

In one embodiment, the separator is configured in the form of a glass-fiber membrane and/or the carrier membrane is comprised of polytetrafluoroethylene or PTFE, and/or the electrodes are comprised of platinum.

In one embodiment, the first electrode is configured in the form of a ring. The internal diameter of the ring is preferably adapted to the feedthrough opening of the separator.

BRIEF DESCRIPTION OF THE DRAWINGS

The invention is described in greater detail hereinafter on the basis of exemplary embodiments, with reference to the attached drawings.

In the drawings.

DETAILED DESCRIPTION

Figure 1:
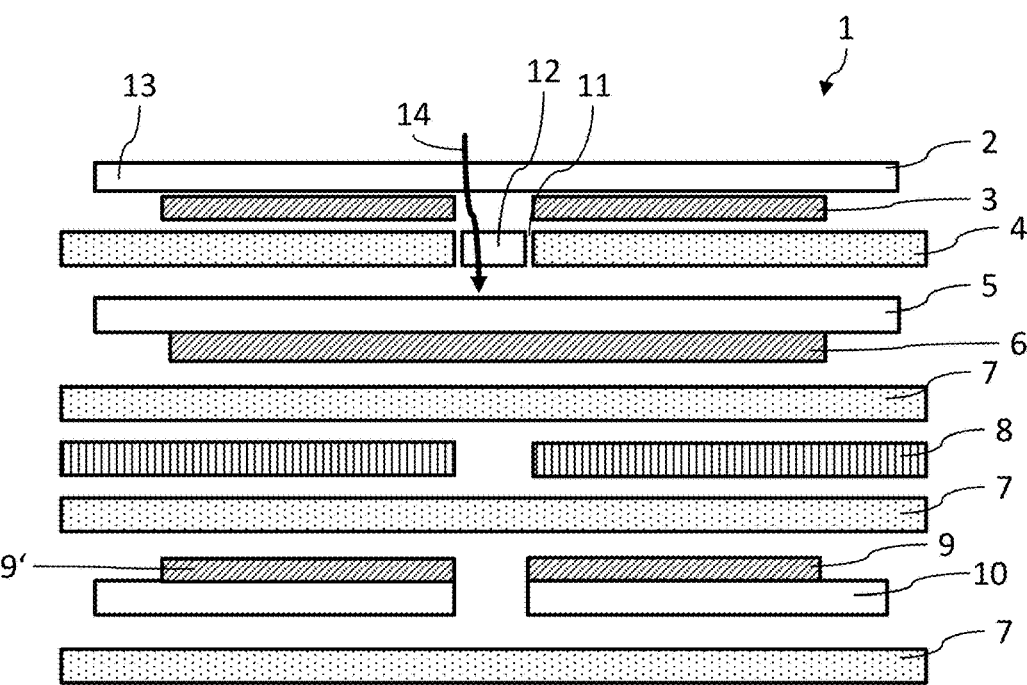
FIG. 1: shows a schematic cross-section of a sensor according to the invention, according to a first embodiment.

FIG. 1 shows a schematic representation of an electrochemical gas sensor 1 according to the invention, having a stacked assembly of electrodes, according to a first embodiment. In the interests of greater clarity, no housing is shown in this schematic representation.

In the example represented, the gas sensor 1 is comprised of layers arranged in the following sequence from top to bottom: a first carrier membrane 2, a first electrode 3 (sensor electrode), a first separator 4, a second carrier membrane 5, a second electrode (auxiliary electrode) 6, a second separator 7, a shielding membrane 8, a third separator 7, a third electrode (counter-electrode) 9, a fourth electrode (reference electrode) 9', a third carrier membrane 10 and a fourth separator 7.

The carrier membranes 2, 5 and 10 are comprised, for example, of polytetrafluoroethylene or PTFE. The separators 4 and 7 are comprised, for example, of a composite glass-fiber material.

In the present example, the gas sensor is configured with a rotationally symmetrical design. The layers represented are thus configured in either a circular or an annular arrangement.

The four electrodes 3, 6, 9 and 9' are respectively arranged directly on the associated carrier membrane 2, 5 and 10, wherein the third electrode 9 and the fourth electrode 9' are arranged on the same carrier membrane 10 and, in each case, occupy only approximately a half-circle thereof.

The electrodes 3, 6 and 9, together with 9', assume a mutually equal diameter which, however, is smaller than the diameter of the carrier membranes 2, 5 and 10. The diameter of the carrier membranes 2, 5 and 10, conversely, is smaller than the diameter of the separators 4 and 7 and of the shielding membrane 8.

It is critical to the invention, however, that the first separator 4 assumes a larger diameter than the respectively adjoining carrier membranes 2 and 5, and that the first separator 4 incorporates a feedthrough opening 11.

In the present example, this feedthrough opening is arranged coaxially in the center of the first separator 4, and is also configured with a circular design. By the rotationally symmetrical configuration of the stacked arrangement, a simple assembly and an error-tolerant design is possible. A more accurate calibration can be achieved accordingly.

By this arrangement of the first separator 4 according to the invention, a central and concentric gas conduction path is constituted. This means that gas diffusion from the first electrode 3 to the second electrode 6 is executed through this feedthrough opening 11 and not, as per the prior art, at the perimeter of the sensor.

The gas conduction path 14 thus requires no structural space at the perimeter of the sensor 1. As a result, the overall diameter of the sensor can be reduced, with no undershoot of the minimum dimension of the electrodes.

Alternatively, the feedthrough opening 11 can also be arranged off-center. It is important, however, that it should be arranged within the structural space defined by the electrodes 3, 6 and thus, specifically, not in the circumferential region 13 of the carrier membranes 2, 5, which projects beyond the electrodes 3, 6.

The feedthrough opening 11 can also assume a different shape, for example quadratic or elliptical. The feedthrough opening 11 permits a reliably reproducible adjustment of gas diffusion to the second electrode. In particular, this also applies to miniaturized sensors.

In the present example, moreover, an insert 12 is inserted in the feedthrough opening 11. This insert 12 is also comprised of PTFE and securely establishes the gas contact and/or gas path between the first electrode 3 and the second electrode 6, through the separator 4. The insert 12 assumes essentially the same shape as the feedthrough opening 11, and occupies the full surface area of the latter.

The third electrode 9 is employed as a reference electrode. The fourth electrode 9' is employed as a counter-electrode. By means of the second and third separators 7 and the shielding membrane 8, it is ensured that no gas is diffused from the second electrode 6 to the third electrode 9 and the fourth electrode 9'. It is important, however, that no gas conduction path 14 is constituted as a result.

Figure 2:
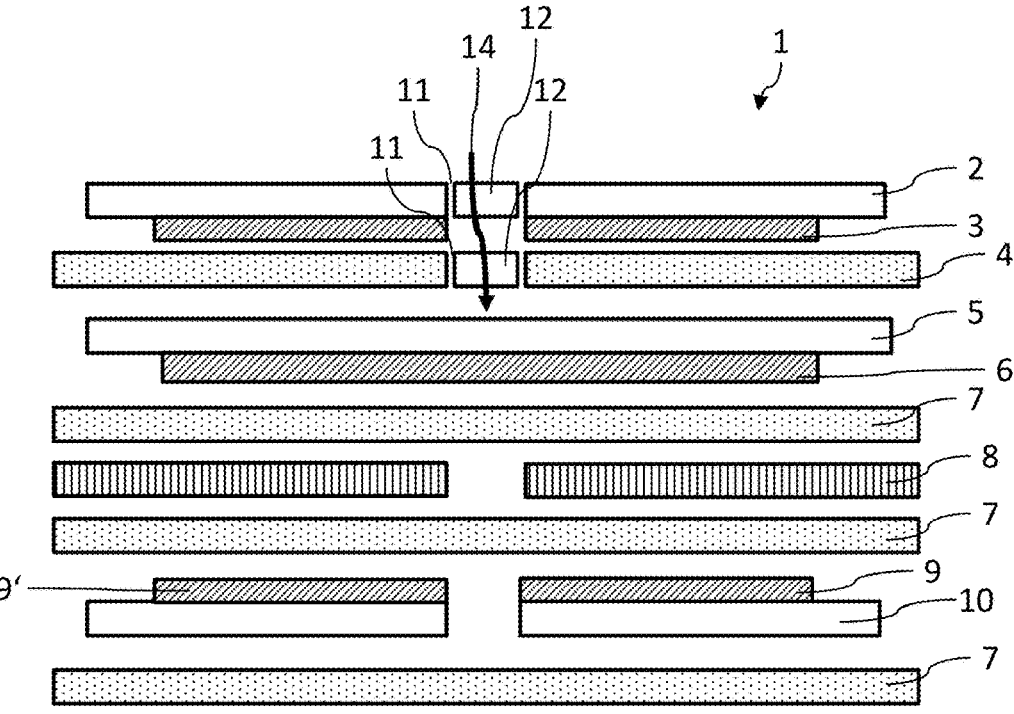
FIG. 2: shows a schematic cross-section of a sensor according to the invention, according to a second embodiment.

FIG. 2 shows an alternative embodiment of a gas sensor 1 according to the invention. The layout thereof, particularly the sequence of layers, is identical to FIG. 1. Accordingly, identical parts are identified by the same reference symbols, and are not described again. There is a single distinction from the embodiment according to FIG. 1, in that the first carrier membrane 2 also incorporates a feedthrough opening, which is preferably configured in an identical manner to the feedthrough opening 11 in the first separator 4.

Figure 3:
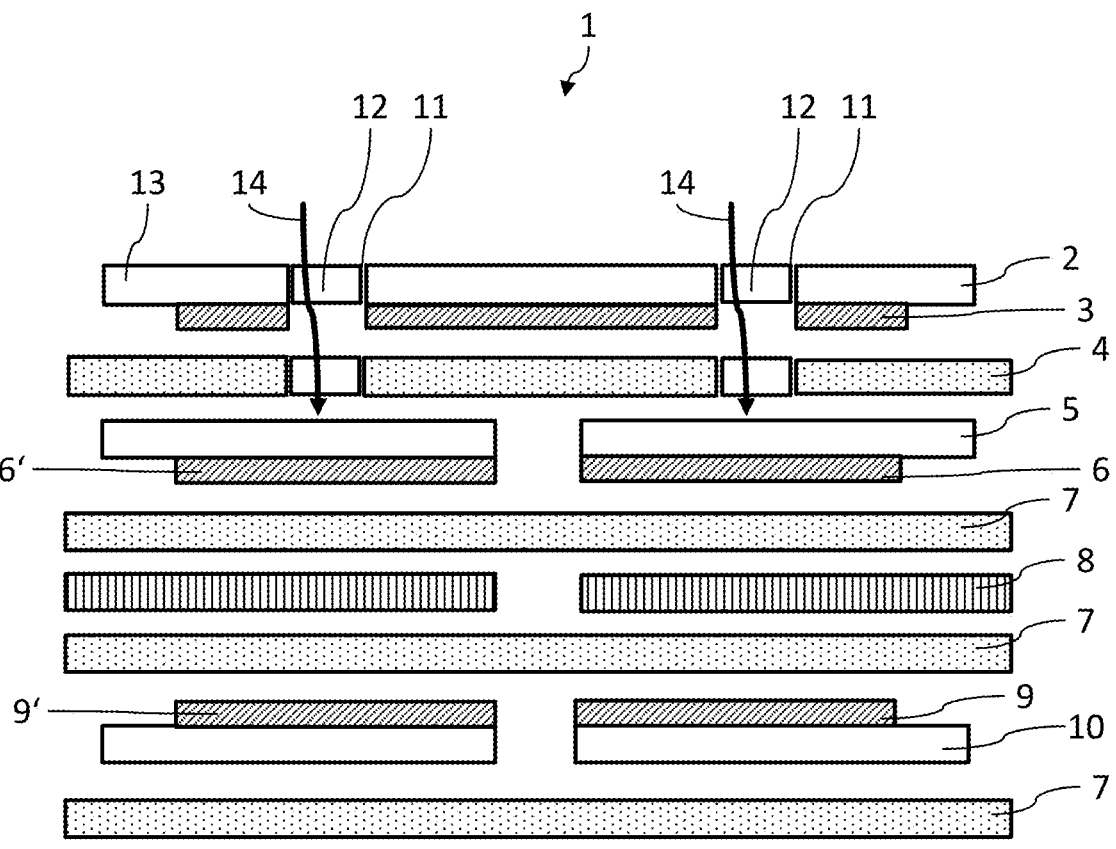
FIG. 3: shows a schematic cross-section of a sensor according to the invention, according to a third embodiment with two independent gas paths.

FIG. 3 shows a further embodiment of a gas sensor 1 according to the invention, in which the sequence of layers is identical to the embodiments according to FIGS. 1 and 2. Accordingly, identical parts are identified by the same reference symbols, and are not described again. However, this embodiment comprises two independent gas paths. To this end, the first carrier membrane 2, the first electrode 3 (the sensor electrode) and the first separator 4 respectively comprise two feedthrough openings 11. Moreover, two second electrodes (auxiliary electrodes) 6 and 6' are provided, as a result of which, effectively, two different sensors are constituted. The two second electrodes 6 and 6' can be configured, for example, with a semicircular or semi-annular design. In this manner, a plurality of different gases can be detected within a housing.

Figure 4:
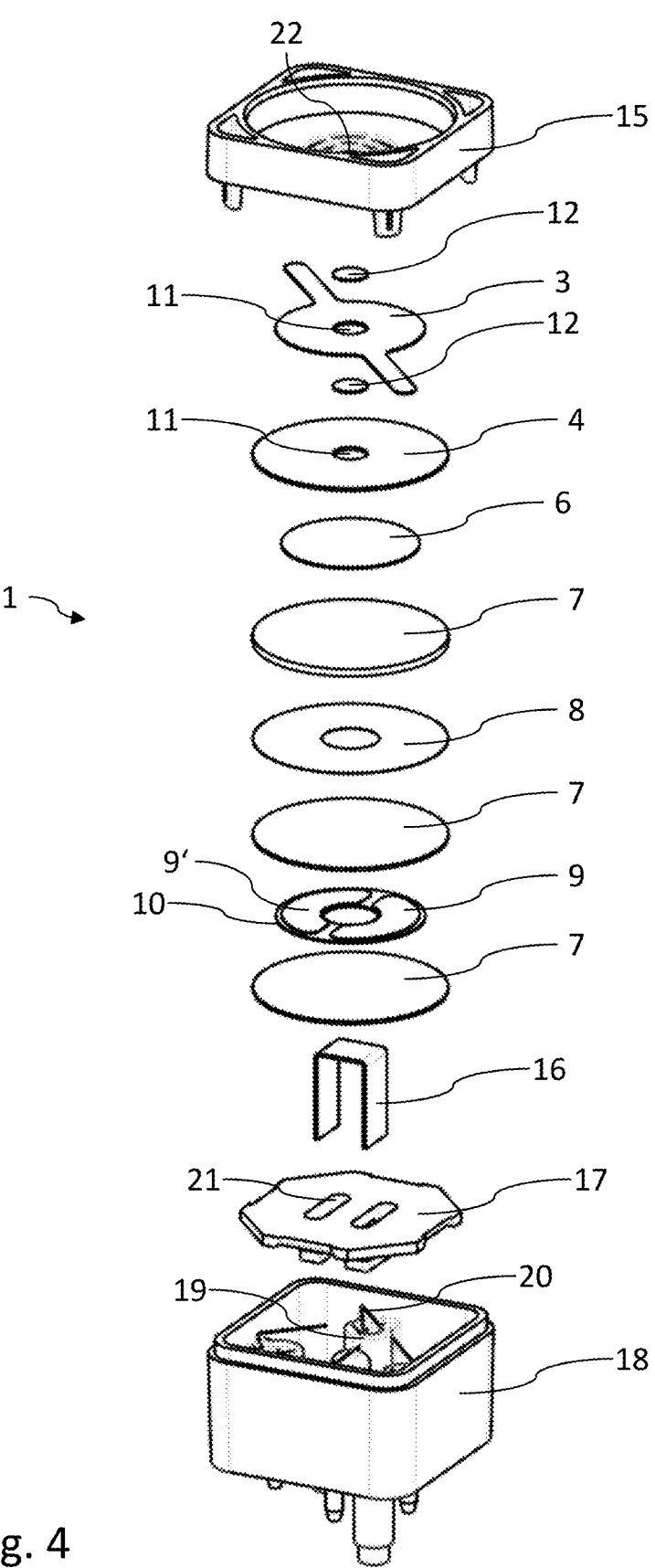
FIG. 4: shows an exploded diagram of a sensor according to the invention.

FIG. 4 shows an exploded diagram of a gas sensor 1 according to the invention. In the present example, the gas sensor 1 comprises a quadratic tank 18. In the present example, the sensor is a carbon monoxide sensor, wherein the tank is filled with 40% sulfuric acid. Tubular projections 19 project from the tank floor, through which electrical contacts for the four electrodes are routed. The electrical contacts comprise platinum wires 20, which can be/are connected to the respective electrodes.

A bed 17 is fitted to the tubular projections 19, which carries the layered structure of the sensor. The bed 17 incorporates two approximately centrally-arranged rectangular openings 21, through which a staple-shaped wick 16 passes. Both ends of the wick 16 are immersed in the sulfuric acid which is contained in the tank, and convey the sulfuric acid to the third electrode 9 and the fourth electrode 9'.

On the bed 17, a separator 7 is firstly arranged. A carrier membrane 10 is applied to the latter, which carries the third electrode 9 and the fourth electrode 9'. A further separator 7 is then arranged on the electrodes 9 and 9'. A shielding membrane 8 is applied to this separator 7.

Above the shielding membrane 8, the following are arranged in the sequence described hereinafter, from bottom to top: a separator 7, a second electrode (auxiliary electrode) 6, a separator 4 and a first electrode 2. The separator 4 and the first electrode 2 incorporate a central feedthrough opening 11, which is closed by an insert plate 12.

The sensor assembly is closed by a cover, wherein openings 22 are arranged in the cover 15 for the permeation of gas.

Figures 5A, 5B, 5C, 5D, 5E, 5F, 5G, 5H, 5I:
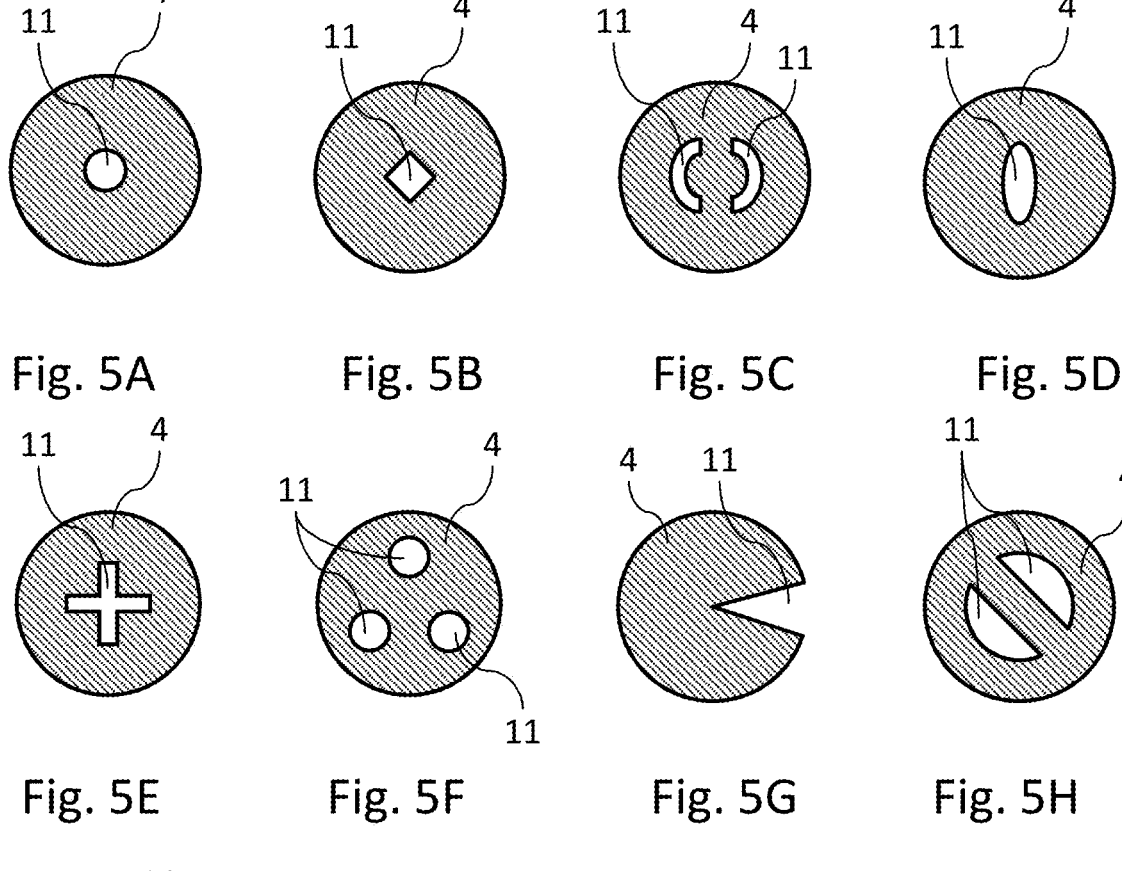
FIGS. 5A-5I: show various designs for the feedthrough openings.

FIGS. 5A-5I shows various exemplary embodiments of feedthrough openings 11 in a first separator 4 which, in the present example, is circular. The first separator 4 can also assume a different shape which, however, has no impact upon the shape of the feedthrough openings. The feedthrough openings illustrated can also be arranged in a first carrier membrane 2. FIG. 5A shows a circular feedthrough opening 11, which is arranged coaxially to the separator 4. FIG. 5B shows a quadratic feedthrough opening 11, which is arranged centrally/coaxially to the separator 4. FIG. 5C shows two approximately bracket-shaped feedthrough openings 11, which are separated by a web.

FIG. 5D shows an elliptical feedthrough opening 11, which is arranged centrally/coaxially to the separator 4. FIG. 5E shows a plus sign-shaped feedthrough opening 11, which is arranged centrally/coaxially to the separator 4. FIG. 5F shows three circular feedthrough openings 11, which are arranged symmetrically to the center of the separator 4. FIG. 5G shows a Pacman-shaped separator 4, wherein a triangular feedthrough opening 11 is arranged at the perimeter of the separator 4. FIG. 5H shows a separator 4 having two circular segment-shaped feedthrough openings 11, which are separated by a web such that, overall, a "no entry" sign-shaped separator 4 is constituted. FIG. 5I shows a separator 4 having two circular feedthrough openings 11 which, however, assume different diameters.

In all the embodiments, the arrangement, size and/or number of feedthrough openings 11 can be varied, in order to achieve a specific and defined gas diffusion rate.

According to a further embodiment, in the embodiments according to FIGS. 5C, 5F, 5h, and 5I, each feedthrough opening 11 can define a separate gas conduction path 14, as represented, for example, in FIG. 3.

LIST OF REFERENCE SYMBOLS

1 Sensor
2 First carrier membrane
3 First electrode (sensor electrode)
4 First separator
5 Second carrier membrane
6, 6' Second electrode (auxiliary electrode)
7 Separator
8 Shielding membrane
9 Third electrode (counter-electrode)
9' Fourth electrode (reference electrode)
10 Third carrier membrane
11 Feedthrough opening
12 Insert
13 Perimeter region
14 Gas conduction path
15 Cover
16 Wick
17 Bed
18 Tank
19 Tubular projection
20 Platinum wire
21 Opening in bed
22 Opening in cover

The invention claimed is:

1. An electrochemical gas sensor (1), comprising:
a stacked assembly of at least one first electrode (3) and a second electrode (6), which are arranged on respective carrier membranes (2, 5);
a separator (4) arranged between the at least one first electrode and the second electrode (3, 6); and
a gas conduction path (14) constituted between the at least one first electrode (3) and the second electrode (6);
the gas conduction path (14) is constituted within a structural space defined by the at least one first electrode and the second electrode (3, 6);
wherein at least one feedthrough opening (11) is arranged in the separator (4), by which the gas conduction path (14) is constituted;
at least one feedthrough opening (11) is arranged in the carrier membrane (2) of the at least one first electrode (3) that is aligned with the at least one feedthrough opening (11) in the separator (4); and
wherein gas diffusion between the at last one first electrode and the second electrode only occurs through the gas conduction path.

2. The electrochemical gas sensor (1) as claimed in claim 1, further comprising an insert (12) inserted in at least one of the at least one feedthrough opening (11) in the separator (4) or the at least one feedthrough opening (11) in the carrier membrane (2) of the at least one first electrode (3).

3. The electrochemical gas sensor (1) as claimed in claim 1, wherein the at least one feedthrough opening (11) is arranged at least one of centrally or coaxially to the at least one first electrode and the second electrode (3, 6).

4. The electrochemical gas sensor (1) as claimed in claim 1, wherein the stacked assembly is configured with a rotationally symmetrical design.

5. The electrochemical gas sensor (1) as claimed in claim 1, wherein the separator (4) is configured as a glass-fiber membrane.

6. The electrochemical gas sensor (1) as claimed in claim 1, wherein the carrier membranes (2, 5) are comprised of polytetrafluoroethylene or PTFE.

7. The electrochemical gas sensor (1) as claimed in claim 1, wherein the at least one first electrode and the second electrode (3, 6) are comprised of platinum.

8. The electrochemical gas sensor (1) as claimed in claim 1, wherein the at least one first electrode (3) is configured as a ring.

9. The electrochemical gas sensor (1) as claimed in claim 1, wherein the separator (4) comprises at least two of the feedthrough openings (11), and a separate gas conduction path (14) is defined by each said feedthrough opening (11) in the separator within the structural space defined by the at least one first electrode and the second electrode (3, 6).

* * * * *